UNITED STATES PATENT OFFICE 2,198,669

PIGMENTED LACQUER EMULSION AND METHOD OF MAKING

Henry Jenett, Harrington Park, and Samuel Meeker, Ridgewood, N. J., assignors to Interchemical Corporation, New York, N. Y., a corporation of Ohio No Drawing. Application November 6, 1937, Serial No. 173,118

5 Claims. (Cl. 134—79)

This invention relates to emulsions of pigmented lacquers and to methods of making them.

Lacquers, which for the purposes of this application are defined as solutions of plastic and solid film-forming binders such as cellulose derivatives and resins in appropriate solvents, have been emulsified with water in various ways. Useful unpigmented lacquer emulsions have been prepared, but difficulty has been experienced in producing stable emulsions of pigmented lacquers.

The lacquer emulsion which we have invented consists of an interior phase of lacquer containing a pigment, preferably in freshly precipitated form, and an external phase consisting of water which may contain some wetting agent. Such an emulsion is stable and highly desirable for use as an intaglio printing ink and for other uses. The fact that it contains freshly precipitated pigment intimately associated with a film-forming agent gives it a brilliant color and high covering power which cannot be attained with pigments which have been dried and ground; and the introduction of the pigment in the form of water pulps produces superior dispersion at low cost as compared with ordinary methods. Our new emulsion is of especial value in decorating textiles.

Our new emulsion is made, in accordance with our invention, by a process consisting of two steps, the first of which produces a water-in-lacquer emulsion containing pigment in the interior, that is, the water, phase. The second step transforms this emulsion into a lacquer-in-water emulsion in which the pigment is again in the interior phase, which is now the lacquer phase, so that the pigment is intimately associated with the solution of the binder.

In carrying out the first step of the method, we vigorously stir or agitate together an unpigmented lacquer, the bulk of whose solvents are water-immiscible, and a pulp consisting of freshly precipitated or re-slurried pigment and water. The amount of pigment is sufficient to pigment the lacque, while the amount of water is sufficient to thoroughly wet the pigment. The amount of water is very substantially less than the amount of lacquer and may run from a few per cent. to 25 per cent. of the amount of the lacquer.

The result of this step is to produce what appears to be a smooth or slightly cloudy pigmented lacquer, but is, in fact, a water-in-lacquer emulsion containing pigment in the interior, water phase.

The second step of the method is carried out by adding a considerable proportion of water, preferably containing a wetting agent, to the emulsion produced by the first step, and emulsifying the mixture, preferably by passing it through a homogenizer or colloid mill. The amount of water added in this step is many times the amount added in the first step. The result of the second step is to reverse the emulsion so that the lacquer becomes the interior phase and the water, the exterior phase. As this reversal takes place, the pigment is transferred to the lacquer phase, so that it is again in the interior phase of the emulsion but is now free from water and dispersed in the solution of binder.

Typical examples of our invention are the following:

EXAMPLE I.—*Nitrocellulose lacquer emulsion*

An unpigmented nitrocellulose lacquer consisting of a binder of

| | Grams |
|---|---|
| ½ sec. R. S. cotton (wet with 30% butanol) | 400 |
| plasticized with | |
| Dibutyl phthalate | 200 |
| Baker's castor oil #16 | 200 |
| Glycerol sebacate | 270 |
| and dissolved in | |
| Sec. hexyl acetate | 210 |
| Octyl acetate | 220 |
| Xylol | 100 |
| Butanol | 100 |
| | 1,700 | is first made, and into this lacquer is stirred a blue pulp consisting of

| | |
|---|---|
| Copper phthalocyanine pigment in freshly precipitated form | 20 |
| Water | 80 |
| | 100 | producing a pigmented water-in-lacquer emulsion amounting to 1,800 grams.
To this is added

| | |
|---|---|
| Distilled water | 770 |
| containing as wetting agents | |
| "Duponol ME" (sodium lauryl sulphate) | 6 |
| Sulphonated castor oil | 12 |
| | 788 | and the mixture is passed through a colloid mill producing a stable, blue, lacquer-in-water emulsion suitable for use as a coating material or as an intaglio ink ---------- 2,588

Example II.—*Cellulose acetate resin lacquer emulsion*

| | Grams |
|---|---|
| Cellulose acetate (low visc.) | 280 |
| Dimethoxyethyl phthalate | 200 |
| Bakelite resin XR3180 | 80 |
| Mesityl oxide | 400 |
| Butyl alcohol | 100 |
| Toluol | 100 |

The above solution is made first, and into it is stirred

| | Grams |
|---|---|
| Watchung red pulp in freshly precipitated form (calcium salt of a monoazo compound—approx. 30% pigment content) | 150 |

The resultant water-in-lacquer emulsion is then mixed with

| | Grams |
|---|---|
| Distilled water | 500 |
| "Duponol ME" | 3 |
| Sulphonated castor oil | 6 |
| Casein | 5 |
| Acetone | 50 | as in Example I, to produce a red lacquer-in-water emulsion _____ 1,875

Example III.—*Cellulose ether emulsion*

| | Grams |
|---|---|
| Cellulose ethyl ether (commercial) | 200 |
| Dibutoxy ethyl phthalate | 200 |
| Blown castor oil | 170 |
| Hexyl alcohol | 120 |
| Xylene | 480 |

The above solution is made, and mixed with

| | Grams |
|---|---|
| a 40% dispersion of carbon black in water | 200 |

To this water-in-lacquer emulsion is added

| | Grams |
|---|---|
| Distilled water | 450 |
| "Duponol ME" | 3 |
| Sulphonated castor oil | 6 |
| Acetone | 46 | and the mixture is treated as in Example I to produce a black emulsion _____ 1,875

The black pigment is slurried in water, and is dispersed much more readily than when an attempt is made to disperse it in organic vehicles.

Example IV.—*Mixed cellulose ester and ether*

| | Grams |
|---|---|
| Low visc. ethyl cellulose | 100 |
| Butyl alcohol wet 15 sec. R. S. cotton | 145 |
| Diphenyl phthalate | 200 |
| Tricresyl phosphate | 100 |
| Hexone | 400 |
| Xylol | 200 |
| Butanol | 100 |

The above lacquer is mixed with

| | Grams |
|---|---|
| Freshly precipitated brilliant fast green toner pulp (phospho-tungstate pigment content approx. 22%) | 120 | and the resultant water-in-lacquer emulsion is mixed with

| | Grams |
|---|---|
| Distilled water | 500 |
| Hercota (castor oil—triethanolamine) | 5 |
| Sulphonated castor oil | 5 | as in Example I, to produce a green emulsion _____ 1,875

Example V.—*Nitrocellulose emulsion*

| | Grams |
|---|---|
| ½ sec. R. S. nitrocellulose (butyl-wet) | 400 |
| Baker's blown castor oil | 450 |
| Dibutyl phthalate | 150 |
| Sec. hexyl acetate | 200 |
| Octyl acetate | 200 |
| Ethyl lactate | 100 |
| Butyl alcohol | 100 |
| Toluol | 100 |

Total clear vehicle _____ 1,700

Into above vehicle stir

| | Grams |
|---|---|
| Black dispersion (carbon black 40%, water 60%) | 650 |
| Indigo toner-pulp (pigment 20%, water 80%) | 400 |

Making a water-in-lacquer emulsion weighing _____ 2,750

The above, containing over 25% of water, is mixed with

| | Grams |
|---|---|
| Distilled water | 400 |
| "Duponol ME" | 12 |
| Sulphonated castor oil | 24 |
| Acetone | 64 | as in Example I, to produce a black emulsion weighing _____ 3,250

Example VI.—*Phenolic resin emulsion*

| | Grams |
|---|---|
| Synthetic resin solution (67% resin of the phenol formaldehyde condensation type, 13% Sunoco mineral spirits, 20% butanol) | 1,000 | is mixed with

| | Grams |
|---|---|
| Freshly precipitated chrome yellow pulp (65% concentration) | 160 | and the emulsion is mixed with

| | Grams |
|---|---|
| Distilled water | 550 |
| Nekal A (sodium sulphonate of aromatic hydrocarbon) | 15 | to make a yellow lacquer-in-water emulsion _____ 1,725

Example VII.—*Urea resin emulsion*

| | Grams |
|---|---|
| Beetle syrup (urea formaldehyde resin solution: 50% resin, 25% xylol, 25% butanol) | 800 |
| A. D. M. 100 oil (blown linseed-oil—lacquer type) | 500 |
| Xylol | 150 |
| Toluol | 150 |

The above lacquer is mixed with

| | Grams |
|---|---|
| Titanium dioxide pulp (75% pigment) | 500 | and then mixed with

| | Grams |
|---|---|
| Distilled water | 600 |
| "Duponol ME" | 25 | as in Example I, to produce white emulsion _____ 2,725

The titanium dioxide is reslurried in water after calcination, and ground but not dried. The use of such a pulp saves the expense of drying the pigment slurry, and provides superior dispersion.

While we have shown but a few examples of our invention, it is, of course, not limited to the particular lacquers, pigments, solvents and wetting agents shown.

By the expression "freshly precipitated pigment", we mean a pigment which has never been dried or ground so that it retains the fineness and the color which it had when originally formed.

What we claim is:

1. A method of making a pigmented lacquer emulsion, which comprises mixing pigment and water in an unpigmented water-immiscible lacquer to produce a water-in-lacquer emulsion, and thereafter mixing this emulsion with additional water to reverse the phase of the emulsion and produce a lacquer-in-water emulsion containing pigment in its lacquer phase.

2. A method of making a pigmented lacquer emulsion, which comprises mixing a pulp of pigment and water in an unpigmented water-immiscible lacquer to produce a water-in-lacquer emulsion, and thereafter mixing this emulsion with additional water containing a wetting agent to reverse the phase of the emulsion and produce a lacquer-in-water emulsion containing pigment in its lacquer phase.

3. A method of making a pigmented lacquer emulsion, which comprises mixing a pulp of freshly precipitated pigment and water in an unpigmented water-immiscible lacquer to produce a water-in-lacquer emulsion, and thereafter mixing this emulsion with additional water containing a wetting agent to reverse the phase of the emulsion and produce a lacquer-in-water emulsion containing in its lacquer phase pigment in freshly precipitated form.

4. A method of making a pigmented lacquer emulsion which comprises mixing a pulp of pigment and water in an unpigmented water-immiscible lacquer to produce a water-in-lacquer emulsion, and thereafter passing this emulsion and additional water containing a wetting agent through emulsifying apparatus to reverse the phase of the emulsion and produce a lacquer-in-water emulsion containing pigment in its lacquer phase.

5. A method of making a pigmented lacquer emulsion, which comprises mixing pigment and water in an unpigmented water-immiscible lacquer to produce a water-in-lacquer emulsion, the amount of water added in this step being a fraction of the amount of lacquer but sufficient to wet the pigment, and thereafter passing this emulsion and additional water through emulsifying apparatus to reverse the phase of the emulsion and produce a lacquer-in-water emulsion containing pigment in its lacquer phase, the additional water amounting to many times the amount of water added in the first step.

HENRY JENETT.
SAMUEL MEEKER.